Feb. 21, 1967  R. S. ROSENBERG ET AL  3,305,782
METHOD AND APPARATUS FOR PREDETECTION, RECORDING AND PLAYBACK
Filed May 25, 1962 2 Sheets-Sheet 1

INVENTORS
RAYMOND S. ROSENBERG
EDWARD E. SWANSON
BY
Mead, Browne, Schuyler & Beveridge
ATTORNEYS

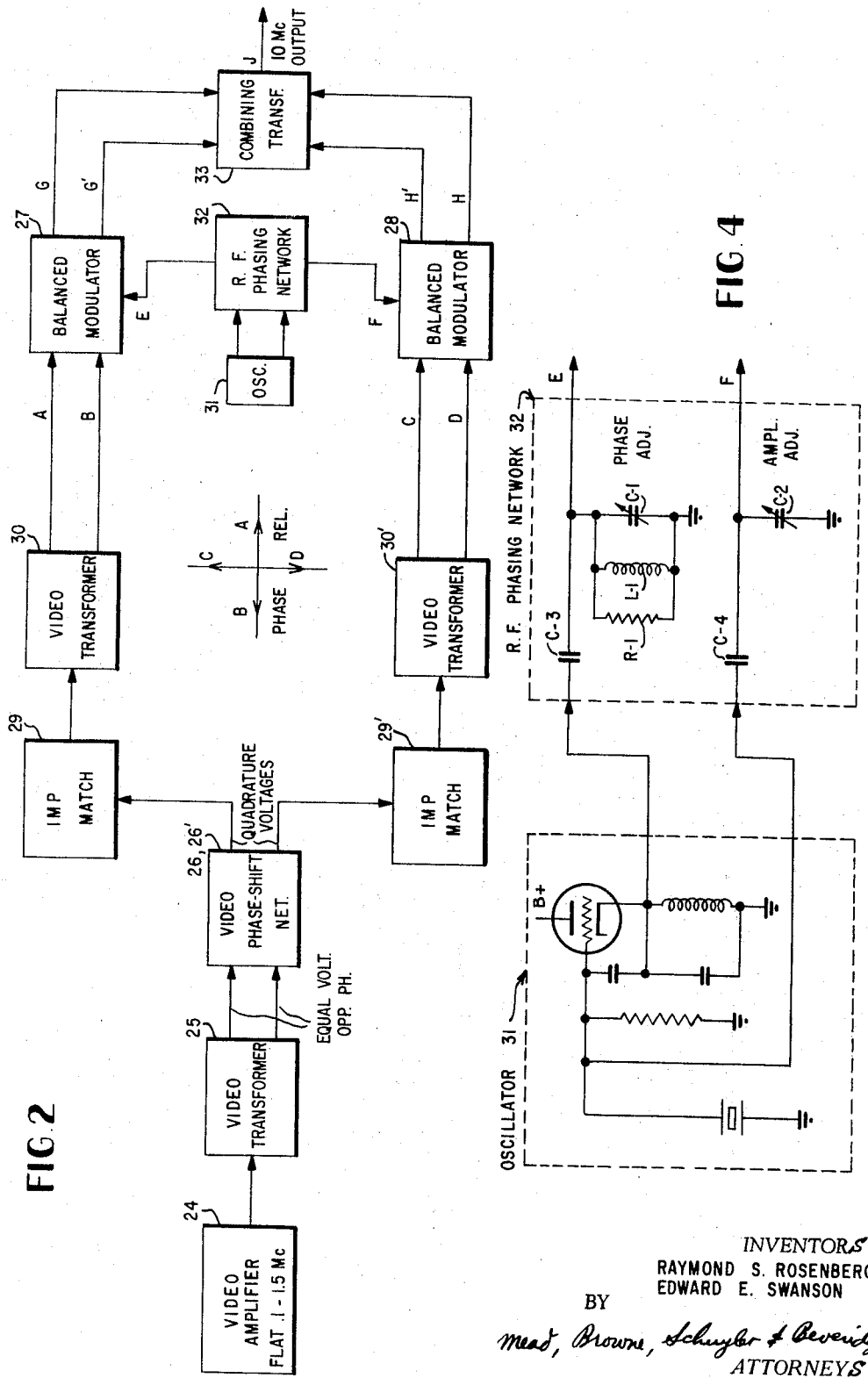

United States Patent Office 3,305,782
Patented Feb. 21, 1967

3,305,782
METHOD AND APPARATUS FOR PREDETECTION, RECORDING AND PLAYBACK
Raymond S. Rosenberg, Kensington, and Edward E. Swanson, Rockville, Md., assignors to Defense Electronics, Inc., Rockville, Md., a corporation of Maryland
Filed May 25, 1962, Ser. No. 197,712
10 Claims. (Cl. 325—345)

This invention relates generally to pre-detection recording of telemetry signals and more particularly to suppression of images and spurious signals appearing when the high frequency from the receiver is translated to a lower frequency and re-translated to the receiver I.F. for detection thereinafter.

In monitoring signals from experimental apparatus such as missiles, aircraft and other remotely controlled high speed objects, it is common practice to employ high frequency radio signals, usually in multiplexed form and generally in the UHF band, and to receive these signals in a transceiver or other type of receiver, after which they are reduced to an intermediate frequency, or I.F., of about 10 mc. frequency. Previous practice has been to demultiplex signals according to frequency and to separately detect and record the desired signals. For many purposes and especially when involved demultiplexing requires computer facilities, it is preferable to record all frequencies prior to demultiplexing and detection, in order to conserve signals which might readily be lost in the detection or demultiplexing processes. A portion of the I.F. signal voltage might be immediately detected, or detection may be effected at a central station from the recording alone. Recorders do not readily accept and respond to the usual 10–12 megacycle I.F. signals, making necessary a lower frequency. A recorder having a wide band width of frequencies acceptable for recording, as for example, zero to 1.5 mc., can record the frequencies of a many track multiplexed signal. A 10 mc. I.F. signal may be reduced in frequency to the center frequency of the recorder band pass, such as 750 kc., frequency variations up to 700 kc., either side thereof may be successfully recorded.

In reproducing such a recording the signal must generally be reconverted to the original I.F. and then processed through a demultiplexing stage and each signal detected in a demodulator similar to that at the conventional receiver, or of intricate control station computer type. In up-translating the frequency from the lower frequency, spurious signals are generated which interfere with the full band width utilization. These spurious signals generally include the heterodyne oscillator frequency and a side band which is the image of that desired, that is, the other side band. In order to make full utilization of the band widths a close tolerance of frequencies passed and rejected is required, but this is difficult to obtain in practice since the rejection and acceptance bands in any normal filtering process overlap to the extent of making the desired close division between accepted and rejected signals impracticable.

It is accordingly an object of this invention to provide a means for recovering all of the data from a VHF time multiplexed signal without losses of parts thereof in filtering and conversion from one frequency to another.

Another object of the invention is to provide means and method for recording an IF information signal at a lower frequency before demultiplexing the signal.

A further object of the invention is to provide automatic means for cancelling an undesired side band produced in frequency translation without the employment of a sharp filter.

A further object of the invention is to provide improved means for selecting one side band only of frequency modulation from a signal containing a fundamental frequency and both side bands thereof.

A still further object of the invention is to provide new and improved means for translation and reproduction of predetection recordings.

These and other objects are achieved by the use of phase shift networks each feeding a balanced modulator 90° out of phase with respect to each other and fed with the output of a crystal oscillator which is shifted 90° in one modulator with respect to that fed to the other modulator. The outputs of the modulators are combined to produce the desired I.F. output when the phase shift networks are fed in common from the recorder. Such an output signal is then fed into the normal I.F. channel of the receiver and thence to the detector and to the utilization or other recording circuitry which may be applied to the detector output. The recorder may be fed from the I.F. channel of the receiver after frequency reduction by well known means inasmuch as spurious heterodyne signals in so reducing a frequency are out of frequency range and are not found to interfere with such recording.

These and other features of the invention will be more clearly understood in connection with the description of the drawings in which:

FIG. 2 is a block diagram of the reproduce mode Up-translator;

FIG. 4 is a schematic diagram of another portion of the circuit of FIG. 2.

Figure 1:
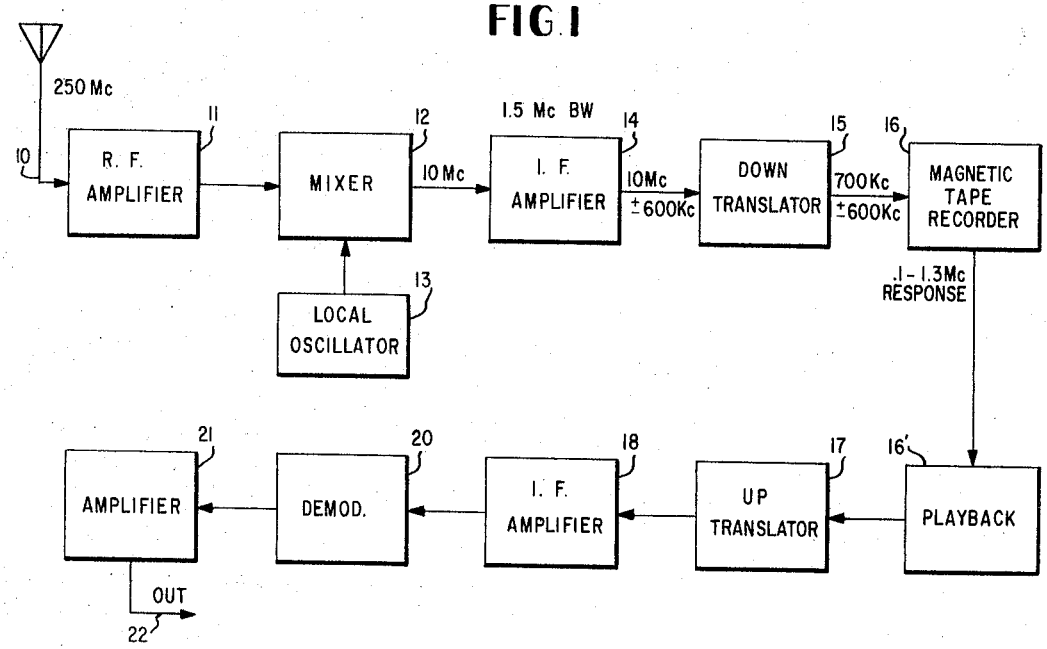
FIG. 1 is a block diagram of a system according to this invention.

Telemetering signals are ordinarily transmitted from a moving object such as a space vehicle or missile in the VHF frequency band. Such a signal is represented in the drawings as received by an antenna and lead 10 at a frequency of 250 mc. This signal is then passed to a radio frequency amplifier 11 and then to a mixer 12 which is supplied with a heterodyning oscillation from an oscillator 13 in order to beat the frequency down to approximately 10 megacycles. The 10 megacycle signal obtained is referred to as the I.F. signal and will have a broad band of frequency modulation such as 1.5 mc., and is amplified in an I.F. amplifier designated 14.

While it is possible to produce an amplifier of broad band characteristics, such as the amplifier 14, designed to pass frequencies in the neighborhood of 10 mc. plus or minus .75 mc. better performance is usually obtained by limiting the signal which is passed to the amplifier to somewhat less than the 1.5 mc. band width specified for the amplifier. Accordingly, the signal passed from the amplifier 14 to the Down-translator 15 is indicated as 10 mc. plus or minus 600 kc. The Down-translator is of conventional type such as may be used in any super heterodyne receiver. The purpose of the Down-translator is to reduce the frequency of the signal which is to be recorded to a value which will be accepted by a magnetic recording head in a recorder. As illustrated in FIG. 1, a magnetic tape recorder 16 has a frequency response of 100 kc. to 1.5 mc. It thus might have a center frequency of 700 kc. to 800 kc. plus or minus 600 kc. or 700 kc. Such recorders as that illustrated at 16 are commercial and need no further description herein.

It will be recognized that when a radio signal is received and demodulated directly the detector stage would follow the I.F. amplifier 14 and would be effective to recover from the 10 mc. signal 1.2 mc. of frequency modulation information signal. Such a signal, however, may consist of more than 100 different channels of information disposed within the frequency band, presenting considerable problem of demultiplexing in order to separate the signal into channels of information. It will be appreciated that when the frequency modulation extends over 1.2 mc. of frequency band and 120 channels are involved, there is available a band width in each channel of 10 kc., including a measure of filter overlap frequencies at either end of each signal band necessary to effect the separation of the bands within the overall frequency modulation band.

One of the difficulties experienced in telemetering where a very large amount of information is necessary on a single transmission resides in the difficulty of separating the channels of information where a hundred or more different kinds of information are being sent substantially at the same time. The demultiplexing operation is involved and complex and is best performed in a central station where a very elaborate computer apparatus is available. It is for this reason that a magnetic recording using a conventional recorder such as 16 is desirable and generally necessary. Since the recorder 16 accepts frequencies for recording not much in excess of 1.5 mc. of frequency limit, it is necessary to employ the Down-translator 15 as before mentioned. However, when the recording is played back in a playback device such as 16′ it cannot be directly inserted in a demodulator which derives the useful information from the frequency modulated wave as recorded. Instead it is necessary to reconvert this signal which centers at 700 kc. to something like the 10 mc. signal which was inserted into the down-translator. To effect this raising of the frequency for the purpose of demodulation, it is, of course, necessary to make the recorder and playback output with a heterodyning frequency such as 9.3 mc. in order that the center frequency of the reproduced I.F. shall be 10 mc. as before recorded. This signal will then be subject to a frequency variation of plus or minus 6 or 7%, which is well within the capabilities of demodulator devices available.

It has been previously mentioned that a problem exists in Up-translation which is not present in Down-translation of a frequency modulated signal. The Up-translator 17 is fed from the playback output and effects the Up-translation of the frequency as mentioned and has an output to the I.F. amplifier 18 which is then passed through a demultiplexer, if multiplexed, each channel going via a demodulator 20 to an amplifier 21 from which the output is taken as a recorded or visual signal, or as an audio output. It will be appreciated that when a demultiplexer is employed the circuitry may be highly complex and of many stages in order to have as many as 120 different outputs. The demodulator 20 when employed after the demultiplexer would normally consist of the number of demodulators required to handle the number of outputs from the demultiplexer which are provided. Since there are many ways of demultiplexing and demodulating the schematic diagram of FIG. 1 merely illustrates the processing of one output.

The real necessity for up-translation of the recorded information during the reproduce mode becomes evident when relative bandwidths are considered. The state-of-the-art for FM/FM telemetry discriminators is such that 7½ or 15% bandwidths are in standard use and 30 or 40% bandwidths are available for special applications with reduced linearity. Good linearity is important in reproduction of predetection recordings in order to avoid further degradation of signal-to-noise ratio (already severely limited by the small dynamic range of the magnetic recording process), and it is not considered practical to produce a discriminator having the bandwidths required for reproduction of predetection recordings. For example, a recorded bandwidth of 1.2 mc. is a bandwidth approaching 200% of the center frequency, if centered at 700 kc. to remain within recorder limits of .1 to 1.5 mc. In addition, it then also becomes impossible to remove the modulating information from this carrier wave since their spectra overlap. For any reasonable utilization of recorder bandwidth, it is therefore necessary to up-translate the recorded data to a region where linear demodulation of the full bandwidth may be accomplished.

Two types of single side-band frequency translators are available to be used in this system. Both employ balanced modulators to suppress the conversion oscillator frequency, however, the method for attenuating the undesired side-band is different in the two systems. However, due to the problems encountered in designing adequate filters, it is necessary to impose some bandwidth restrictions upon the receiver itself. In order to insure that there is sufficient rejection of the undesired image frequencies the IF selectivity of the receiver must add to that available in the translator. The maximum usable bandwidth is then approximately equal to the center-frequency. Thus, a system operating at 700 kc. would occupy a bandwidth of ±350 kc. (350 kc. to 1.05 mc.) or approximately ⅔ of the available recorder bandwidth. This translator will meet present missile range instrumentation standards and specifications, but does not make efficient use of the recorder bandwidth.

The preferred technique uses the phase shift principle to cancel the undesired side-band and permits using nearly 90% of the recorder bandwidth. Among the problems encountered in the phase-shift translator have been satisfactory design of a wideband phase-shift network and maintaining stable carrier balance. By the means here shown these problems are overcome and the phase-shift technique has been successfully applied to this type of translator. Its incorporation in the system permits full use of almost 9/10 of the recorder bandwidth, rather than the ⅔ available with the filtering translator. The advantages of using this translator become evident when recording time is considered. In many cases the recorder may be operated at half the speed usually required for recording a given signal, thus, doubling the available recording time.

In the reproduce mode the output signal from the readout apparatus is passed to a special phase-shift network which has the property of shifting the phase of a very wide band of frequencies by a constant amount of phase regardless of frequency. As indicated in FIG. 2 the outputs of the phase-shift networks 26 and 26′ have a difference in phase of 90° for each frequency of the wide band of frequencies. Each of these outputs is passed through a balanced modulator circuit 27 or 28. The output of the video phasing networks 26, 26′ is taken preferably through impedance matching networks 29, 29′ and wide band video transformers 30, 30′ to the balanced modulators 27 and 28 by way of lines designated A, B, C, D. A desirable arrangement for elements 29, 29′ includes a cathode follower driving an emitter follower to provide a high input impedance and a very low output impedance. Transformers 30, 30′ provide push-pull outputs to drive the deflecting electrodes of the balanced modulators when employing tubes of the 7360 type.

The resulting phases in lines A, B, C, D going to modulators 27, 28 are shown in the vector diagram as equal amplitude voltages of 90° phase displacements developed by inversion in transformers 30, 30′ of the quadratured inputs. The balanced modulator 27 may be of the type conventionally employing diodes in a bridge circuit, transistors, triode electron tubes, or other multi-element electron tubes but is preferably of the type employing a special electron tube having two anodes and deflecting means for varying the percentage of the discharge current between the two anodes of the tube. One such tube is referred to as type 7360. The up-translation is effected by means of a heterodyning operation in which a crystal oscillator 31 is caused to operate at a frequency such as 10.7 mc. This oscillator has a direct output to the balanced modulator 28 preferably with an amplitude-adjusting circuit, comprising a capacitive voltage divider including capacitors C-2 and C-4. The oscillator has a second output to a phase-shift network 32, the purpose of which is to produce a 90° shift of phase of the 10.7 mc. oscillator output. The output of the phase shift network 32 is connected to the balanced modulator 27, to form the second input thereto to produce an output by a mixing of the RF and video frequency signals. Similarly an output is produced by the balanced modulator 28. These outputs are taken by lines G, G', H, H' to combining transformer 33 to produce a single-ended output at the desired band centered around 10 mc.

It will be appreciated that the up-translator is properly described as a phase-shift translator such as might be employed in single side band transmission, but that it has been considerably modified in order to accept the extreme wide frequency limits necessary for the purpose of this invention and that single sideband cancellations relate to AM sidebands and carrier cancellations.

Figure 3:
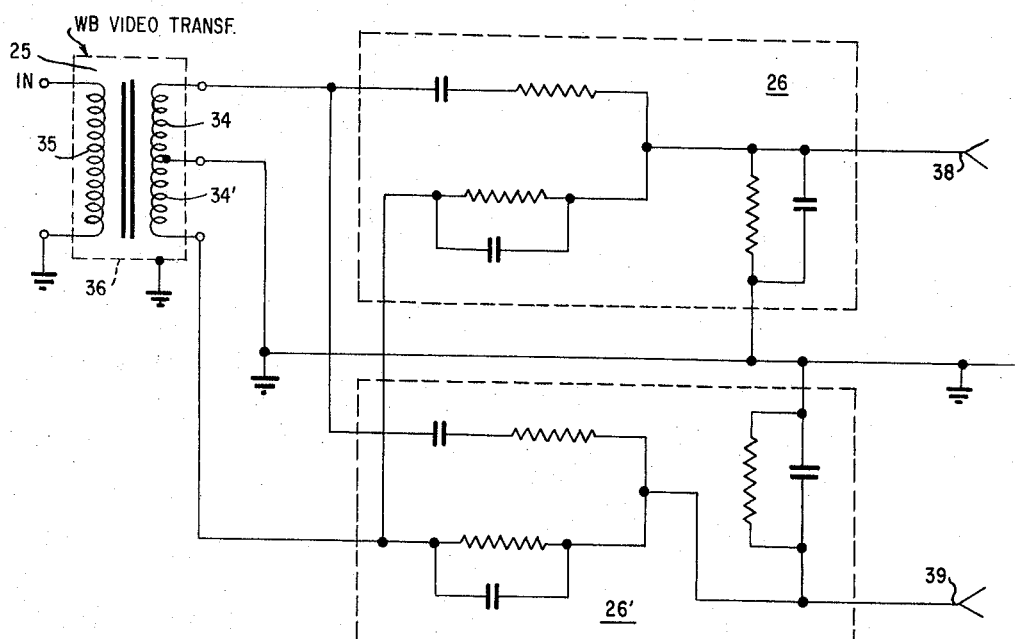
FIG. 3 is a schematic diagram of a portion of the circuit of FIG. 2.

There is illustrated in FIG. 3 a type of phase shift network of particular value in the translator of this invention. Preferably, the input from the video amplifier is separated into two lines by means of a wide band transformer such as 25 which has a primary winding 35, one side of which is grounded and a secondary center-tapped to ground with the ends connected similarly to each phase-shift network as illustrated at 26 and 26'. The two outputs at 38 and 39 are alike and at a constant phase difference, preferably at 90°. One side of each network 26, 26' is grounded as illustrated in FIG. 3 and the outputs taken at 38 and 39.

A desirable RF phasing network is obtained by coupling an output of oscillator 31 through a small capacitor C-3 of optimum value to the parallel resonant circuit comprising variable capacitor C-1, a fixed inductor L-1 and a fixed resistor R-1 to produce a voltage 90° displaced from the oscillator output, the phase being adjusted by varying C-1, the output being at E. A second oscillator output is taken at F via the adjusting voltage divider comprising C-2 and C-4.

Outputs at E and F are adjusted to be 90° apart in phase and approximately equal in amplitude. C-2 provides means for securing amplitude equality. The adjustment permits compensation as may be desired for unequal efficiencies in the modulator tubes and associated circuits since the outputs at the plates must be equal to effect a complete cancellation of the signal image band. The output at the oscillator frequency is balanced out by adjustment of the beam deflection potentials of the balanced modulator tubes, and the action of the combining transformer. The undesired signals are balanced out by the action of the combining transformer, which consists of a magnetically and capacitively balanced primary and an unbalanced secondary arranged to preserve the primary balance.

It will also be recalled that the objective of this invention is to produce a very high percentage utilization of the frequency band available and that one object is to employ some 90% of all of the frequencies employed for useful purposes in contrast to the usual 40% or less which has been available before. In accomplishing this the phase shift translator beats with two components of about 700 kc. which is modulated to have frequency components between 100 kc. and 1.3 mc.

In the normal single side band practice it is desired to reduce channel band width requirements. The carrier and one side band are removed for this purpose. In this invention the spuriously generated image and the heterodyning frequency are removed because they would interfere with and prevent the use of this system due to the inability to filter frequencies so closely alike. The complete elimination of the signal image is thus essential and is here accomplished in a finely adusted arrangement of RF phasing network and video phasing network feeding balanced modulators of special type. The final cancellation of image and oscillator frequencies is effected in the combining transformer.

While the invention has been described in connection with a particular embodiment it will be realized that it may be otherwise practiced in an equivalent manner, within the scope of the appended claims.

It should be pointed out that this invention does not use a single side band system as such and, in fact, the spectrum associated with the I.F. signal being down-translated and up-translated is preserved. The signals present at the output of the balanced modulators are (1) the desired signal and its sidebands (2) the oscillator frequency which is not a part of or directly related to the desired output (3) another signal and its sidebands where this signal contains the same intelligence as the desired signal but has a different center frequency. The oscillator signal (2) and the undesired signal (3) must be eliminated to avoid degrading the desired signal. The system here disclosed then resembles the generation of a second or third I.F. which is recorded. This is played back and shifted in frequency to the original I.F. frequency. The up-translation produces a further I.F. which is not desired and is eliminated.

What is claimed is:

1. The method of recovering information from an intermediate frequency signal containing a high percentage of frequency deviation which comprises the steps of heterodyning said signal down to a frequency approximating the center frequency of said deviation, recording the resulting frequency band, remotely reproducing said recorded signal as a band of frequencies including said deviation bandwidth, recreating said intermediate frequency signal as the sum and difference combination of two quadrature related carrier waves of like magnitude modulated, respectively, by quadrature related versions of the reproduced signal, and demodulating said recreated intermediate frequency signal.

2. The method of demodulating a frequency modulated signal in delayed relation to reception thereof, comprising the steps of receiving a signal containing said frequency modulated signal, producing therefrom an intermediate frequency signal having a center frequency of the order of 10 mc. including frequency modulations of the order of 15% bandwidth, heterodyning said intermediate frequency signal to a frequency range centered below one mc. and containing the same bandwidth of frequencies, said bandwidth containing variations of substantially 90%, recording said bandwidth of frequencies, reproducing from said recording said bandwidth of frequencies, translating said bandwidth of frequencies to a higher frequency, said translation being accomplished in a phase-shift frequency translator, preserving in said translator one side band of heterodyned frequency to produce a single side band of information signal varying about said intermediate frequency, and thereafter demodulating said frequency modulated signal.

3. The method of reproducing information from a record of a variable frequency signal recorded in substantially 90% of the frequency spectrum of a recorder, including the steps of reproducing an electrical signal of substantially 90% frequency variation, phase shifting by substantially 90° one portion of said signal while leaving unshifted another portion thereof, developing a heterodyne frequency signal, phase shifting a portion of said heterodyne frequency signal, balanced modulator mixing the phase shifted portions of said reproduced signal and said heterodyne frequency signal, balanced modulator mixing said unshifted portions of said first signal and heterodyne frequency signal, and taking an output from said balanced modulator mixed signals as a combined single-ended signal.

4. In a recorded broad band FM signal playback system to up-translate recording frequencies to an IF frequency band prior to detection, means recovering an FM signal at said recording frequencies, means producing two phase quadratured push-pull signals from the recovered FM signal,
means producing a constant IF frequency for heterodyning with said produced signals,
means shifting the phase of said constant frequency and producing first and second output voltages therefrom in phase quadrature,
first and second balanced modulator means responsive to said push-pull signals and respectively controlled in output by said first and second output voltages, and
means combining said controlled outputs to provide an IF signal,
said constant IF signal and the image of said FM signal being cancelled.

5. In a playback system according to claim 4, said balanced modulators being beam deflection tubes whereof beam deflectors are under control of said push-pull signals, respectively, and said first and second output voltages having outputs therefrom connected to cancel said IF image.

6. In a system according to claim 4, said combining means including means variably shifting the phase of said push-pull signals with respect to said phase quadrature independently of voltage magnitude control of signals thereto.

7. In a circuit for up-translating an FM modulated signal of bandwidth an order of magnitude greater than the lower limiting frequency thereof to an IF frequency signal in a higher range, comprising
means developing a voltage varying in frequency proportionally to said FM signal,
means producing at fixed frequency a voltage for combining with said developed voltage to produce sum and difference frequency images approximating said higher frequency range,
means providing quadratured phases of said fixed frequency voltage in like amplitude,
means producing a pair of push-pull voltages in phase quadrature from said developed voltage,
balanced modulator means heterodynedly combining said push-pull voltages with said quadratured phases, respectively, and balancing out said fixed frequency and one said image to produce said IF signal.

8. In a circuit according to claim 7, said balanced modulator means being connected to cancel one said image by subtraction of oppositely phased push-pull voltages and to provide an output by addition of in phase push-pull voltages constituting the desired FM image signal in said IF range.

9. In the circuit of claim 7 said means providing quadratured phases of said fixed frequency voltage in like amplitude comprising
a crystal-controlled oscillator including a tank circuit grounded at one end and resonantly tuned for output at said frequency,
a parallel resonant circuit including a capacitor adjustable for resonant response near said frequency,
and means coupling said tank circuit and said resonant circuit as a double tuned circuit to provide a phase shift variable about 90° for adjustment of said capacitor.

10. A circuit according to claim 9 including a crystal-controlled circuit stabilizing said oscillator at said frequency and a capacitative voltage divider thereacross for selecting an output voltage of variable amplitude independently of said adjustment of phase shift.

References Cited by the Examiner
UNITED STATES PATENTS

| | | | |
|---|---|---|---|
| 2,297,409 | 9/1942 | Heinecke | 331—164 |
| 2,298,774 | 10/1942 | Parker | 331—164 |
| 2,375,577 | 5/1945 | Norton | 325—345 |
| 2,687,476 | 8/1954 | Guanella | 325—345 |
| 2,752,570 | 6/1956 | Hall | 332—45 |
| 2,916,546 | 12/1959 | Ginsburg et al. | 178—6.6 |
| 3,040,125 | 6/1962 | Dillenburger et al. | 178—6.6 |

KATHLEEN H. CLAFFY, *Primary Examiner,*
ROBERT H. ROSE, DAVID G. REDINBAUGH,
*Examiners.*
S. J. BOR, T. G. KEOUGH, R. S. BELL,
*Assistant Examiners.*